(12) United States Patent
Ishihama et al.

(10) Patent No.: US 10,797,298 B2
(45) Date of Patent: Oct. 6, 2020

(54) BATTERY AND MANUFACTURING METHOD THEREFOR

(71) Applicant: Murata Manufacturing Co., Ltd., Nagaokakyo-shi, Kyoto-fu (JP)

(72) Inventors: Kazuya Ishihama, Nagaokakyo (JP); Yasuhiro Matsuzaki, Nagaokakyo (JP); Tatsuo Niino, Nagaokakyo (JP); Takuya Horie, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 36 days.

(21) Appl. No.: 16/202,610

(22) Filed: Nov. 28, 2018

(65) Prior Publication Data
US 2019/0097206 A1    Mar. 28, 2019

Related U.S. Application Data
(63) Continuation of application No. PCT/JP2017/020017, filed on May 30, 2017.

(30) Foreign Application Priority Data

May 31, 2016 (JP) ................................. 2016-108373

(51) Int. Cl.
*H01M 10/04* (2006.01)
*H01M 2/36* (2006.01)
(Continued)

(52) U.S. Cl.
CPC ......... *H01M 2/367* (2013.01); *H01M 2/0202* (2013.01); *H01M 2/361* (2013.01);
(Continued)

(58) Field of Classification Search
CPC ....... H01M 10/04; H01M 10/05; H01M 2/367
See application file for complete search history.

(56) References Cited

U.S. PATENT DOCUMENTS 5,498,488 A * 3/1996 Stocchiero .......... H01M 2/0242
                                                429/72
5,549,717 A    8/1996 Takeuchi et al.
(Continued)

FOREIGN PATENT DOCUMENTS

JP    H0837010 A    2/1996
JP    H10241741 A    9/1998
(Continued)

OTHER PUBLICATIONS

International Search Report issued for PCT/JP2017/020017, dated Sep. 5, 2017.
(Continued)

*Primary Examiner* — Olatunji A Godo
(74) *Attorney, Agent, or Firm* — Arent Fox LLP (57) ABSTRACT

A battery has an electrode body which has an outer periphery and includes positive and negative electrodes with a separator disposed there between in a stacking direction. The battery further include an exterior body having a shape other than a substantially rectangular parallelepiped or cuboidal shape. The electrode body and an electrolytic solution are housed in the exterior body. The exterior body has at least first, second and third inner surfaces with the first and third inner surfaces being located on opposite sides of the second inner surface. The second inner surface is larger in area than the first and second inner surfaces. A liquid injection port is located in the exterior body and extends through the second inner surface. Each of the first, second and third inner surfaces faces and is spaced from a respective first, second and third section of the outer periphery of the electrode body by a respective gap so as define first, second and third regions, respectively, each of which has a respective volume. The volume the second region is larger than the volumes of the first and third regions and is capable of temporarily
(Continued)

holding a volume of the electrolytic solution injected into the outer case via the liquid injection port.

11 Claims, 4 Drawing Sheets

(51) Int. Cl.
    *H01M 10/058*     (2010.01)
    *H01M 2/02*     (2006.01)
(52) U.S. Cl.
    CPC ......... *H01M 10/04* (2013.01); *H01M 10/058* (2013.01); *H01M 2002/0205* (2013.01)

(56) References Cited

U.S. PATENT DOCUMENTS

| | | |
|---|---|---|
| 6,946,220 B2 | 9/2005 | Probst et al. |
| 7,273,674 B1 | 9/2007 | Frustaci et al. |
| 2003/0077509 A1 | 4/2003 | Probst et al. |
| 2008/0221629 A1 | 9/2008 | Morgan et al. |

FOREIGN PATENT DOCUMENTS

| | | |
|---|---|---|
| JP | 2002008634 A | 1/2002 |
| JP | 2003217601 A | 7/2003 |
| JP | 2013097980 A | 5/2013 |

OTHER PUBLICATIONS

Written Opinion of the International Searching Authority issued for PCT/JP2017/020017, dated Sep. 5, 2017.

\* cited by examiner

BATTERY AND MANUFACTURING METHOD THEREFOR

CROSS REFERENCE TO RELATED APPLICATIONS

The present application is a continuation of International application No. PCT/JP2017/020017, filed May 30, 2017, which claims priority to Japanese Patent Application No. 2016-108373, filed May 31, 2016, the entire contents of each of which are incorporated herein by reference.

TECHNICAL FIELD

The present invention relates to a battery with an electrode body and an electrolytic solution housed in an exterior body, and a manufacturing method therefor.

BACKGROUND OF THE INVENTION

A class of batteries include an exterior body which houses an electrode body including positive and negative electrodes having a separator there between and an electrolytic solution which at least partially permeates the electrode body. In such batteries, an injection port is provided in the exterior body and, at the time that the battery is manufactured, the electrolytic solution is injected into the exterior body via the injection port. The electrolytic solution is injected bit by bit and it takes time to penetrate into the exterior body. It is therefore necessary to inject the electrolytic solution separately multiple times.

Japanese Patent Application Laid-Open No. 10-241741 (Patent Document 1) discloses a battery provided with a plurality of liquid injection ports. With the plurality of liquid injection ports provided, when the electrolytic solution is injected from any of the liquid injection ports, the gas in the exterior body is discharged from the other liquid injection port, and the electrolytic solution in an amount corresponding to the discharged gas can be thus injected smoothly into the exterior body.

The shape of the exterior body is typically a cuboid or a rectangular parallelepiped shape. For example, the shape of the exterior body disclosed in Patent Document 1 is a substantially rectangular parallelepiped shape with rounded corners.

However, in the case where the exterior body has a non cuboidal or parallelepiped shape (sometimes referred to herein as an "irregular shape"), the time required for causing the electrolytic solution to permeate the entire inside of the electrode body varies depending on the position of the liquid injection port. Therefore, the productivity of manufacturing the battery depends on where the liquid injection port is provided. However, until now the relationship between the shape of the exterior body and the optimum position for the liquid injection port was not known (or at least shared) and it has been sometimes difficult to perform efficient injection.

An object of the present invention is to provide a battery capable of shortening the time it takes to inject a sufficient amount of an electrolytic solution into an exterior body having an irregular shape to cause the electrolytic solution to permeate the entire inside of an electrode body, and a manufacturing method therefor.

BRIEF DESCRIPTION OF THE INVENTION

In accordance with an aspect of the invention, a battery includes:

an electrode body including a positive electrode, a negative electrode and a separator disposed between the positive electrode and the negative electrode, the positive electrode, the negative electrode and the separator being stacked one on top of the other in a stacking direction, the electrode body having an outer periphery;

an electrolytic solution; and an exterior body that has a shape other than a substantially rectangular parallelepiped or cuboidal shape, the exterior body housing the electrode body and the electrolytic solution, the exterior body having at least first, second and third inner surfaces with the first and third inner surfaces being located on opposite sides of the second inner surface, the second inner surfaces being larger in area than the first and third inner surfaces; and a liquid injection port located on the exterior body and extending through the second inner surface;

each of the first, second and third inner surfaces facing and being spaced from a respective first, second and third section of the outer periphery of the electrode body by a respective gap so as define first, second and third regions, respectively, each having a respective volume, the volume the second region being larger than the volumes of the first and third regions and being capable of temporarily holding a volume of the electrolytic solution injected into the outer case via the liquid injection port.

In accordance with a further aspect of the invention, the distance between the first and third inner surfaces and the first and third sections of the outer periphery of the electrode body is preferably less than 20 µm. In accordance with a further aspect of the invention, the distance between the second inner surface and the second section of the outer periphery of the electrode body is preferably between 50 µm and 500 µm.

In accordance with a further aspect of the invention, the relationship between a volume V1 of the holding region, a volume V2 of the electrode body, and a porosity X (%) of the electrode body is: $20 \leq V1/(V2 \times X/100) \leq 80$.

In a preferred embodiment, the electrode body is a laminated electrode body having a plurality of the positive electrodes and a plurality of the negative electrodes which are alternately laminated in the stacking direction with a respective separator interposed there between.

In one preferred embodiment of the invention, the shape of the exterior body is an L shape. In another preferred embodiment of the invention, the shape of the laminated body is a T shape. In another preferred embodiment of the invention, the shape of the laminated body is a trapezoidal shape.

In a preferred embodiment of the invention, the liquid injection port is located in the center of the second inner surface.

In a preferred embodiment of the invention, the shape of the electrode body is the same as the shape of the shape of the exterior body.

The disclosed invention is also directed toward a method for manufacturing a battery. In accordance with the preferred embodiment, an exterior body having an electrode body housed therein is provided. The exterior body has a shape other than a substantially rectangular parallelepiped or cuboidal shape, and at least first, second and third inner surfaces with the first and third inner surfaces being located on opposite sides of the second inner surface. The second inner surfaces is larger in area than the first and second inner surfaces. The electrode body comprises a positive electrode, a negative electrode and a separator disposed between the positive and negative electrodes. The positive electrode, the negative electrode and the separator are stacked one on top of the other in a stacking direction. The electrode body has an outer periphery. Each of the first, second and third inner surfaces face and are spaced from a respective first, second and third section of the outer periphery of the electrode body by a respective gap so as define first, second and third regions, respectively. Each region has a respective volume, the volume the second region being larger than the volumes of the first and third regions and being capable of temporarily holding a volume of the electrolytic solution injected into the second region via a liquid injection port extending through the second inner surface. Thereafter, the electrolytic solution is injected into the second region via the liquid injection port. The injection of the electrolytic solution into the second region is stopped and at least part of the injected electrolytic solution is allowed to permeate inside of the electrode body. Thereafter, the electrolytic solution is repeatedly injected and stopped until the electrolytic solution penetrates into the entire inside of the electrode body.

According to the present invention, the electrolytic solution injected from the liquid injection port is temporarily held in the holding region between the largest inner surface of the exterior body and the electrode body, which is the largest region among the regions between the respective inner surfaces of the exterior body and the electrode body in a direction parallel to the direction in which the positive electrode, the separator, and the negative electrode are arranged, and permeates the inside of the electrode body little by little, and the amount of the electrolytic solution injected at a time can be thus increased. Thus, even when the exterior body has an irregular shape other than a rectangular parallelepiped and a cube, the number of injections until the nonaqueous electrolytic solution permeates the entire inside of the electrode body can be reduced to shorten the time until the nonaqueous electrolytic solution permeates the entire inside of the electrode body.

PREFERRED EMBODIMENTS OF THE INVENTION

Features of preferred embodiments of the present invention will be further specifically described below. The preferred embodiments are described with reference a lithium ion battery. However, the invention is not so limited and can be used in other types of batteries.

First Embodiment

Figure 1:
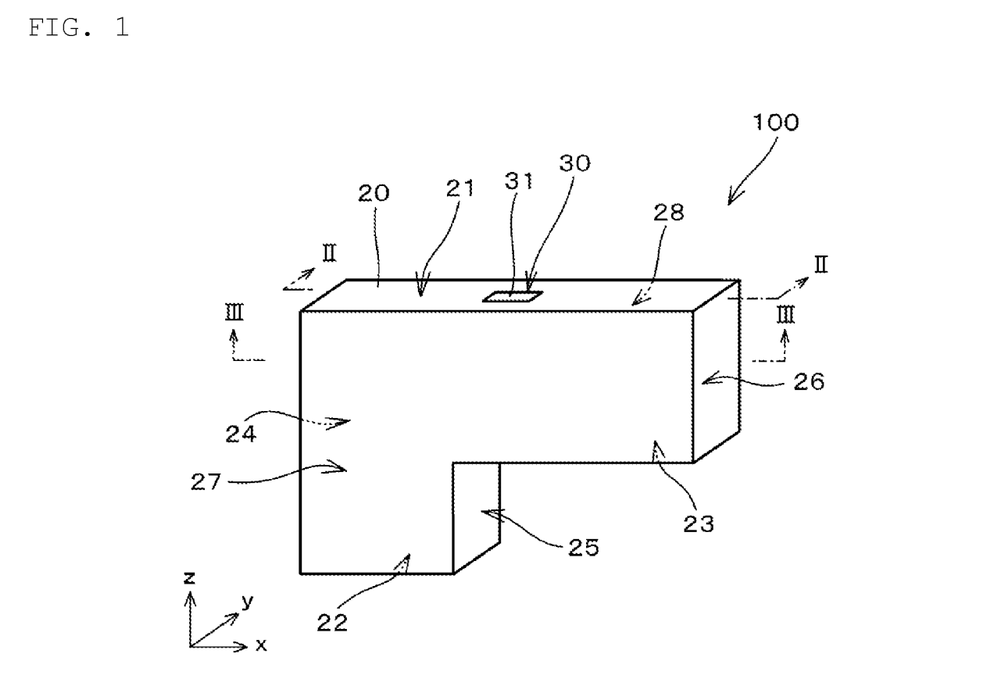
FIG. 1 is a perspective view illustrating the appearance shape of a lithium ion battery according to a first embodiment of the present invention.
Figure 2:
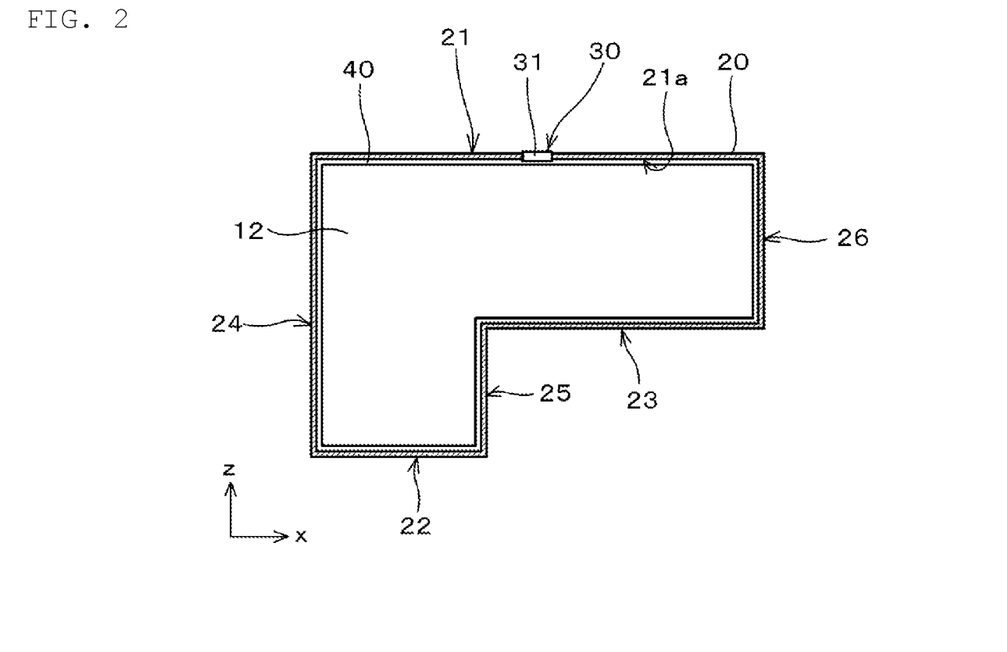
FIG. 2 is a cross-sectional view of the lithium ion battery shown in FIG. 1 along the line II-II.
Figure 3:
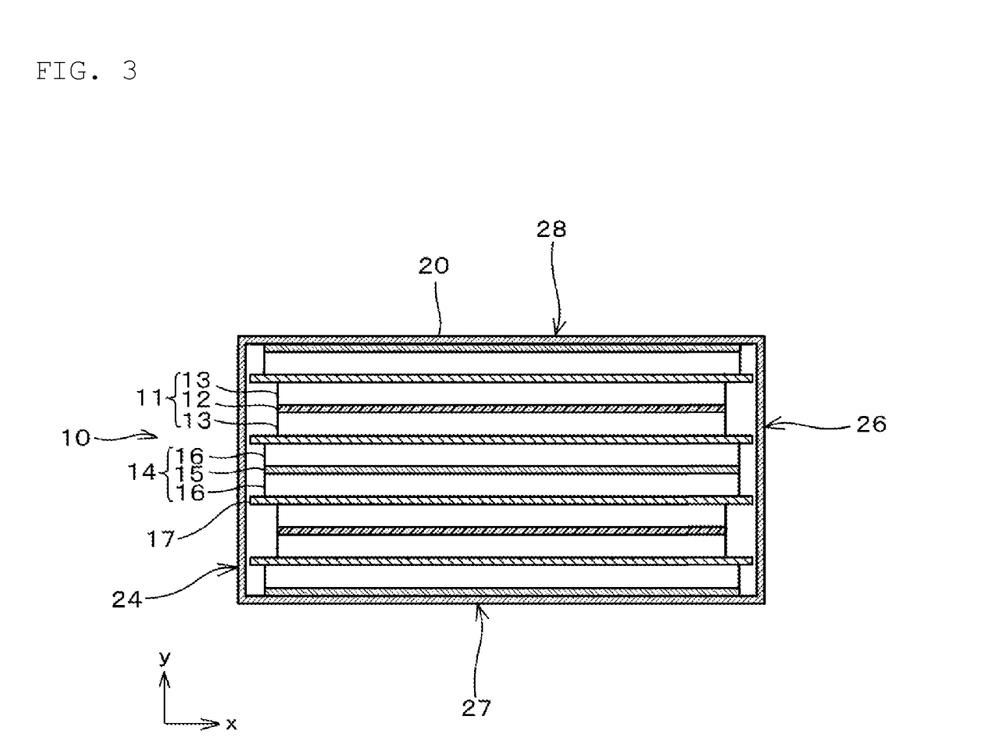
FIG. 3 is a cross-sectional view of the lithium ion battery shown in FIG. 1 along the line III-III.

FIG. 1 is a perspective view illustrating the appearance shape of a lithium ion battery 100 according to the first embodiment. FIG. 2 is a cross-sectional view of the lithium ion battery 100 shown in FIG. 1 along the line II-II. FIG. 3 is a cross-sectional view of the lithium ion battery 100 shown in FIG. 1 along the line III-III.

The lithium ion battery 100 includes an electrode body 10 housed in an exterior can 20 which operates as an exterior body for housing the electrode body 10 and a nonaqueous electrolytic solution (not shown) which at least partially (and preferably entirely) impregnates the electrode body.

As shown in FIG. 3, the electrode body 10 is preferably a laminated electrode body composed of a plurality of positive and negative electrodes 11 and 14, respectively, which are alternately stacked with respective separators 17 interposed there between. In this specification, the direction (y-axis direction) in which the positive electrodes 11 and the negative electrodes 14 are stacked is referred to as a stacking direction.

The positive electrodes 11 are preferably formed by coating opposed main surfaces of positive electrode current collectors 12 made of a metal foil such as aluminum with a positive electrode active material 13. As shown in FIG. 2, the positive electrode current collector 12 has an L shape. The positive electrode active material 13 can be, for example, a lithium cobalt oxide, a lithium nickel oxide, a lithium manganese oxide, a lithium iron phosphate, or the oxide or phosphate where the transition metal is partially substituted with another metal. These may be used alone, or two or more thereof may be used in combination. The positive electrode current collectors 12 are all connected to a positive electrode terminal (not shown).

The negative electrodes 14 are preferably formed by coating opposed surfaces of negative electrode current collector 15 made of a metal foil such as copper with a negative electrode active material 16. The negative electrode current collector 15 has an L shape. The negative electrode active material 16 can be, for example, a carbon material such as graphite (natural graphite, artificial graphite), hard carbon, and soft carbon, an oxide such as silicon oxide, tin oxide, indium oxide, zinc oxide, and lithium oxide, or a binary, ternary or higher alloy of lithium and a metal such as Al, Si, Pb, Sn, In, Bi, Ag, Ba, Ca, Hg, Pd, Pt, Te, Zn, and La. These may be used alone, or two or more thereof may be used in combination. The negative electrode current collectors 15 are all connected to a negative electrode terminal (not shown).

In the preferred embodiment, the separators 17 are sheet-shaped separators which are composed of, for example, thin microporous membranes made of polypropylene with excellent insulation property. Like electrodes 11 and 14, the separators 17 have a corresponding L shape. When the separators 17 are composed of the thin microporous membranes, lithium ions can pass through the separators 17. It should be noted that the separators 17 are not limited to sheet-shaped separators. For example, bag shaped separators can be used. In such a case, each bag shaped separator houses a respective positive or negative electrodes 11 or 14. Alternatively, and without limitation, the separators may have a zig-zag form.

The nonaqueous electrolytic solution preferably includes a solute and a solvent. As the solute, for example, a Li salt such as LiPF6 or LiBF4 is preferably used. As the solvent, for example, an organic solvent is preferably used, such as ethylene carbonate (EC), propylene carbonate (PC), dimethyl carbonate (DMC), ethyl methyl carbonate (EMC), and diethyl carbonate (DEC). The electrolyte may be liquid, or a polymeric electrolyte may be used.

The exterior can 20 is made of a metal such as stainless steel, aluminum, nickel, or iron, and has an irregular shape, i.e., one that it not substantially a rectangular parallelepiped and a cubic shape. As used herein, the term "substantially rectangular parallelepiped" includes a rectangular parallelepiped having rounded corners. In addition, as used herein, the term "substantially cubic shape" includes a cubic shape with rounded corners.

According to the present embodiment, the exterior can 20 has a first, second and third outer surfaces 21, 22 and 23 that are parallel to the xy plane, fourth, fifth and sixth outer surfaces 24, 25 and 26 that are parallel to the yz plane and seventh and eighth outer surfaces 27 and 28 that are parallel to the xz plane.

The second and third outer surfaces 22 and 23 each oppose the first outer surface 21. The fifth and sixth outer surfaces 25 and 26 each oppose the fourth outer surface 24. The seventh outer surface 27 opposes the eighth outer surface 28. Each of the first through sixth outer surfaces 21 to 26 has an oblong (rectangular) shape. The seventh and eighth outer surfaces 27 and 28 each have an L shape.

The first to sixth outer surfaces 21-26 are preferably planar surfaces which are lie perpendicular to the stacking direction (the Y direction). Of these surfaces, the first surface 21 has the largest area. The thickness of the walls of the exterior can 20 is substantially the same throughout and there is a respective inner surface corresponding to each of the exterior surfaces 21-28 of the exterior can 20. The largest of these inner surfaces is the inner surface 21a (see FIG. 2) corresponding to the first outer surface 21.

In other words, the exterior can 20 has multiple planar inner surfaces corresponding to first to sixth outer surfaces 21-26, respectively, each of which lie perpendicular to the stacking direction. The largest of these inner surfaces is the inside surface 21a corresponding to the first surface 21.

In the preferred embodiment, the seventh surface 27 of the exterior can 20 can be removed as a lid so that the electrode body 10 can be placed inside the exterior can 20. Once the electrode body 10 is placed in the exterior can 20, the seventh surface 27 is coupled to the rest of the electrode body 10 for form a closed space.

The exterior can 20 is provided with a liquid injection port 30 for injecting a nonaqueous electrolytic solution into the can 20 so that it can at least partially impregnate the electrode body. The liquid injection port 30 is sealed with a sealing plug 31.

The liquid injection port 30 is preferably provided at the above-mentioned largest inner surface 21a of the exterior can 20 and more preferably at the center of the largest inner surface 21a.

With this arrangement, a holding region 40 is formed between the largest inner surface 21a of the exterior can 20 and the outer periphery of the electrode body 10 located adjacent the inner surface 21a. The holding region 40 is capable of temporarily holding the nonaqueous electrolyte injected from the liquid injection port 30 at the time of injecting the nonaqueous electrolytic solution.

When the distance between the largest inner surface 21a of the exterior can 20 and the electrode body 10 that constitute the holding region 40 is less than 50 μm, the amount of the nonaqueous electrolytic solution that can temporarily hold is reduced, thereby increasing the number of required injections of the nonaqueous electrolytic solution. In addition, when the distance between the largest inner surface 21a of the exterior can 20 and the electrode body 10 that constitute the holding region 40 is less than 50 μm, there is a possibility that a region of the electrode body 10 will not be impregnated with the nonaqueous electrolytic solution. In such a case, the characteristics of the battery will be degraded. On the other hand, when the distance between the largest inner surface 21a of the exterior can 20 and the electrode body 10 that constitute the holding region 40 is more than 500 μm, the dead space of the battery will be increased, thus making it impossible to obtain a battery with a sufficient volume energy density. Therefore, according to the preferred embodiment, the distance between the largest inner surface 21a of the exterior can 20 and the electrode body 10 that constitute the holding region 40 is between 50 μm and 500 μm.

In the present embodiment, there will also be gaps between the inner walls corresponding to outer walls 22-26 and the outer periphery of the electrode body 10 located adjacent each respective inner surface. Each of these gaps will define a respective region having an area determined by the width of the gap and the length of the inner surface of the outer periphery of the electrode body 10 located adjacent the respective inner surface. The size of at least the regions which are located between the second and third outer surfaces 22 and 23 and the corresponding sections of the outer peripheries of the electrode body 10 (i.e., the horizontally extending regions on the lower portion of FIG. 2) are selected to keep the nonaqueous electrolytic solution injected from the liquid injection port 30 and stored in the holding region 40 from flowing out from the holding region 40. The gaps of these regions can be, for example, less than 20 μm. As long as the distances between the inner surfaces of the exterior can 20 and the outer periphery of the adjacent portion of the electrode body 10 are less than 20 μm, the nonaqueous electrolyte injected from the liquid injection port 30 into the holding region 40 can be prevented from flowing out from the holding region 40.

It should be noted that "the size capable of keeping the nonaqueous electrolytic solution from flowing out from the holding region 40" is not to be considered to mean a size in which no nonaqueous electrolytic solution flows out from the holding region 40 at all, but encompasses a size in which a small amount of the nonaqueous electrolytic solution flows out from the holding region 40.

The desired result can be achieved when the relationship between the volume V1 of the holding region 40, the volume V2 of the electrode body 10, and the porosity X (in percentage) of the electrode body 10 (wherein the porosity X (%) of the electrode body 10 refers to the proportion of the volume of the region where the positive electrodes 11, the negative electrodes 14, and the separators 17 are absent (not provided) to the entire volume V2 of the electrode body 10) meets the following relationship:

$$20 \leq V1/(V2 \times X/100) \leq 80 \tag{1}$$

When V1/(V2×X/100) is less than 20, the holding region 40 is narrowed and the number of injections of the nonaqueous electrolytic solution required to fill the exterior can 20 is increased. In addition there is a possibility that a region of the electrode body 10 will not be impregnated with the nonaqueous electrolytic solution and the characteristics of the battery will be degraded. On the other hand, when V1/(V2×X/100) exceeds 80, the dead space in the battery will be increased, making it impossible to obtain a battery with a sufficient volume energy density. Therefore, it is preferable to establish the relation of the formula (1) among V1, V2, and X.

[Method for Injecting Nonaqueous Electrolytic Solution]

A method for injecting the nonaqueous electrolytic solution will be described, which is one step for manufacturing the lithium ion battery 100. The exterior can 20 in which the electrode body 10 is housed is preferably placed with the largest inner surface 21a upward (relative to gravity). This orientation is shown in FIG. 1. In this condition, the second surface 22 of the exterior can 20 serves as a lower surface.

Subsequently, the nonaqueous electrolytic solution is injected from the liquid injection port 30 into the inside of the exterior can 20.

In this regard, as described above, among respective regions present between the respective inner surfaces of the exterior can 20 and the electrode body 10, the regions adjacent to the holding region 40 are each a region of a size capable of keeping the nonaqueous electrolytic solution injected from the liquid injection port 30 into the holding region 40 from flowing out from the holding region 40. In addition, the nonaqueous electrolytic solution injected from the liquid injection port 30 does not permeate the inside of the electrode body 10 immediately, but permeates the inside of the electrode body 10 little by little over time. Therefore, the nonaqueous electrolytic solution injected from the liquid injection port 30 is temporarily held in the holding region 40 between the largest inner surface 21a of the exterior can 20 and the electrode body 10 and slowly migrates into the electrode body 10. Once the holding region 40 is filled with the nonaqueous electrolytic solution to some extent, the injection is temporarily stopped.

According to the present embodiment, the positive electrodes 11, the separators 17, and the negative electrodes 14 are stacked in the y-axis direction in FIG. 1. Since ends of the positive electrodes 11, the separators 17, and the negative electrodes 14 are exposed at least at the largest inner surface 21a of the exterior can 20, the nonaqueous electrolytic solution accumulated in the holding area 40 between the largest inner surface 21a and the electrode body 10 penetrates the inside of the electrode body 10 little by little from the upper part thereof by gravity.

As the nonaqueous electrolytic solution permeates the inside of the electrode body 10, the nonaqueous electrolytic solution accumulated in the holding region 40 is reduced. When the nonaqueous electrolytic solution accumulated in the holding region 40 is reduced to some extent, the nonaqueous electrolytic solution is again injected into the exterior can 20 via the liquid injection port 30. Once the nonaqueous electrolytic solution is accumulated in the holding region 40 to a sufficient extent, the injection is temporarily stopped until the nonaqueous electrolytic solution at least partially permeates the inside of the electrode body 10.

Repeating the process described above causes the nonaqueous electrolytic solution to completely permeate the entire inside of the electrode body 10.

In this regard, the holding region 40 refers to the region between the largest inner surface 21a of the exterior can 20 and the electrode body 10, and thus, when the distances (gaps) are uniform between the respective inner surfaces of the exterior can 20 and the adjacent outer periphery of the electrode body 10, the holding region 40 is the largest in volume among the regions between the respective inner surfaces of the exterior can 20 and the electrode body 10. Therefore, the largest region as a region for temporarily holding/storing the nonaqueous electrolytic solution injected from the liquid injection port 30 makes it possible to maximize the amount of the liquid injected in a given application. Thus, the number of injections required to ensure that the nonaqueous electrolytic solution permeates the entire inside of the electrode body 10 can be reduced, and the time until the nonaqueous electrolytic solution permeates the entire inside of the electrode body 10 can be shortened. Thus, the manufacturing time for the lithium ion battery 100 can be reduced.

On the other hand, if the liquid injection port 30 is provided at an inner surface of the exterior case 20 other than the largest inner surface 21a, the injected nonaqueous electrolytic solution is temporarily held in a region that is smaller than the holding region 40, the amount of the liquid injected at a time (per application) is smaller, more injections of the nonaqueous electrolyte solution are required and the time required to fully permeate the electrode body 10 with the nonaqueous electrolytic solution increases.

Second Embodiment

Figure 4:
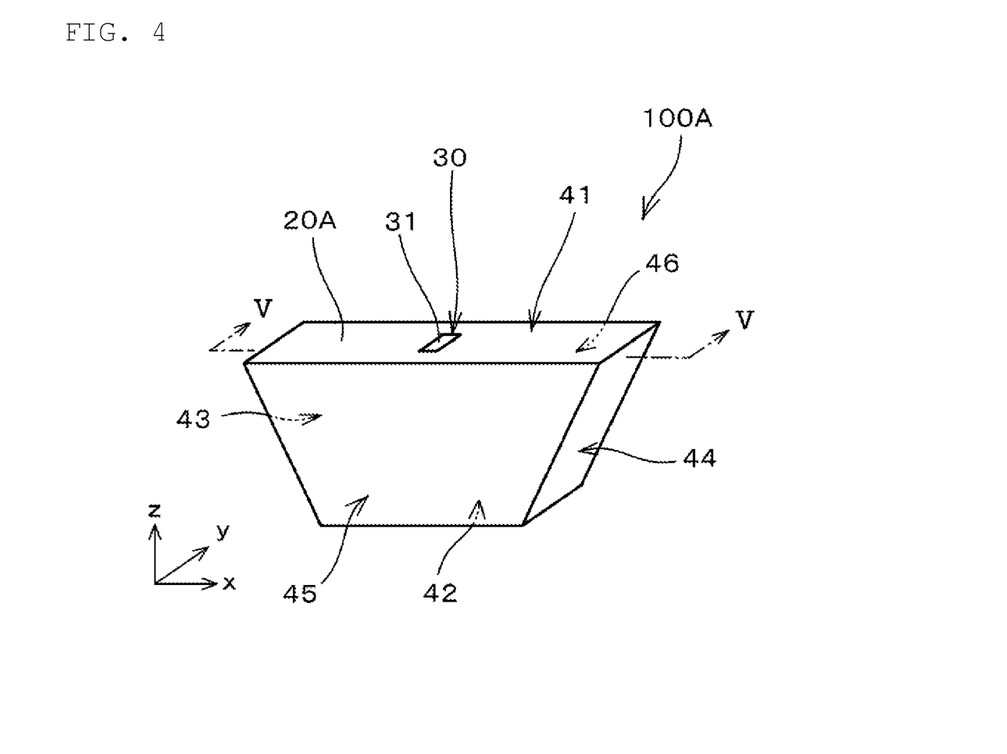
FIG. 4 is a perspective view illustrating the appearance shape of a lithium ion battery according to a second embodiment of the present invention.
Figure 5:
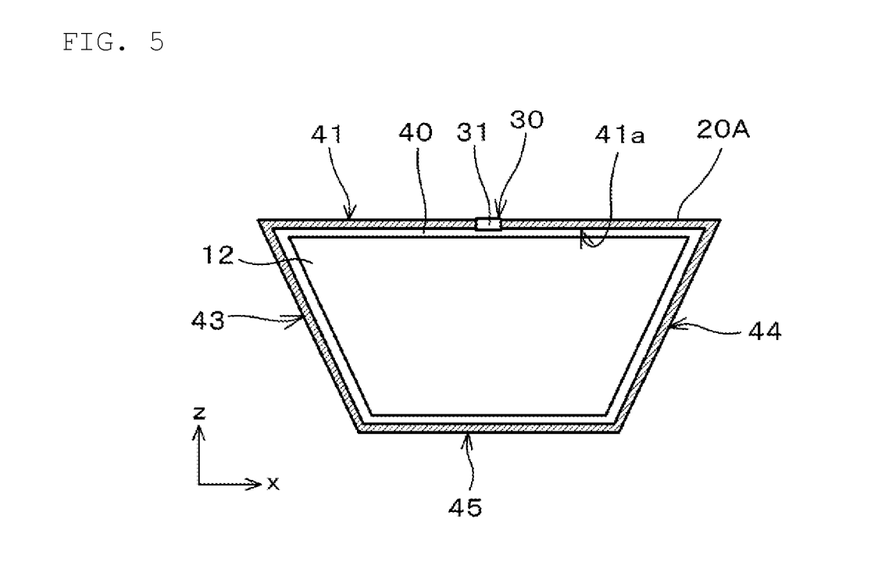
FIG. 5 is a cross-sectional view of the lithium ion battery shown in FIG. 4 along the line V-V.

FIG. 4 is a perspective view illustrating the shape of a lithium ion battery 100A according to the second embodiment. FIG. 5 is a cross-sectional view of the lithium ion battery 100A shown in FIG. 4 along the line V-V. In FIGS. 4 and 5, the same constituents as those shown in FIGS. 1 to 3 are denoted by the same symbols, and detailed descriptions thereof will be omitted.

The lithium ion battery 100A includes an electrode body 10, an exterior can 20A which acts as an exterior body for housing the electrode body 10 and a nonaqueous electrolytic solution (not shown) which is located in the exterior can 20A and at least partially (preferably entirely) impregnates the electrode body 10.

In this embodiment, each of a positive electrodes 11, the separators 17, and the negative electrodes 14 of the electrode body 10 has a trapezoidal shape. The stacking direction of the positive electrodes 11, the separators 17, and the negative electrodes 14 is the y-axis.

The exterior can 20A has an irregular shape (i.e., not a substantially cubic or parallelepiped shape). According to this embodiment, the exterior can 20A has first through sixth outer surfaces 41-46, respectively.

The first and second outer surfaces 41 and 42 are parallel to the xy plane and oppose one another. The fifth and sixth surfaces 45 and 46 are parallel to the xz plane and oppose one another. The first to fourth surfaces 41-44 each have an oblong (rectangular) shape. The fifth and sixth surfaces 45 and 46 each have a trapezoidal shape.

The fifth and sixth surfaces 45-46 are planar surfaces lying parallel to the planes in which the positive electrodes 11, the separators 17, and the negative electrodes 14 lie (i.e., perpendicular to the stacking direction Y). The first and second surfaces 41 and 42 are planar surfaces which are perpendicular to the planes in which the positive electrodes 11, the separators 17, and the negative electrodes 14 lie. The third and fourth surfaces 43 and 44 are planar surfaces which are neither perpendicular nor parallel to the planes in which the positive electrodes 11, the separators 17, and the negative electrodes 14 lie.

Among the first to fourth surfaces 41 to 44, the surface with the largest area is the first surface 41. The thickness of the exterior can 20A is substantially the same at all of the surfaces, and all of the outer surfaces 41-46 have corresponding inner surfaces opposing their respective outer surface. The largest inner surface is an inside surface 41a corresponding to the first surface 41.

A liquid injection port 30 is preferably provided at the above-mentioned largest inner surface 41a of the exterior can 20A and, more preferably, at the center of the largest inner surface 41a.

A holding region 40 is provided between the largest inner surface 41a of the exterior can 20A and the adjacent outer periphery of the electrode body 10. The holding region 40 is capable of temporarily holding the nonaqueous electrolytic solution injected from the liquid injection port 30 before it migrates into and impregnates the electrode body 10. As in the first embodiment, the distance between the largest inner surface 41a and the electrode body 10 that constitute the holding region 40 is preferably between 50 μm and 500 μm. The holding region 40 formed between the largest inner surface 41a and the electrode body 10 has a larger volume than the remaining regions between the other inner surfaces of the exterior can 20A and the respective adjacent outer periphery of the electrode body 10.

As in the first embodiment, each of the regions on opposite sides of the holding region 40 have a size capable of keeping the nonaqueous electrolytic solution injected from the liquid injection port 30 into the holding region 40 from significantly flowing out from the holding region 40. In the present embodiment, the regions adjacent to the holding region 40 are the region between the inside surface corresponding to the third outer surface 43 and the adjacent outer periphery of the electrode body 10 and the region between the inside surface corresponding to the fourth outer surface 44 and adjacent outer periphery of the electrode body 10. The distances between the inner surfaces of the exterior can 20A and the adjacent outer periphery of the electrode body 10 that constitute the foregoing regions are, for example, less than 20 μm.

The nonaqueous electrolytic solution injected from the liquid injection port 30 is temporarily held in the holding region 40 and then slowly penetrates the inside of the electrode body 10 under the influence of gravity and capillary action. Since the holding region 40 is the largest in volume (relative to the other regions described above), it is possible to maximize the amount of the nonaqueous electrolytic solution injected into the outer can 20 at any one time (i.e., per application). Thus, the number of injections that are required to ensure that the nonaqueous electrolytic solution entirely permeates the inside of the electrode body 10 can be reduced, and the time that it takes to permeate the nonaqueous electrolytic solution permeates into the entire inside of the electrode body 10 can be shortened. Thus, the manufacturing time for the lithium ion battery 100 can be reduced.

More specifically, even when the exterior can 20A has a shape as shown in FIG. 4, the liquid injection port 30 is provided at the largest inner surface 41a among the multiple inner surfaces in a direction parallel to the direction in which the positive electrodes 11, the separators 17, and the negative electrode 14 are arranged, thereby making it possible to shorten the time until the nonaqueous electrolytic solution penetrates the entire inside of the electrode body 10, as compared with a configuration in which the liquid injection port 30 is provided at another position.

Third Embodiment

Figure 6:
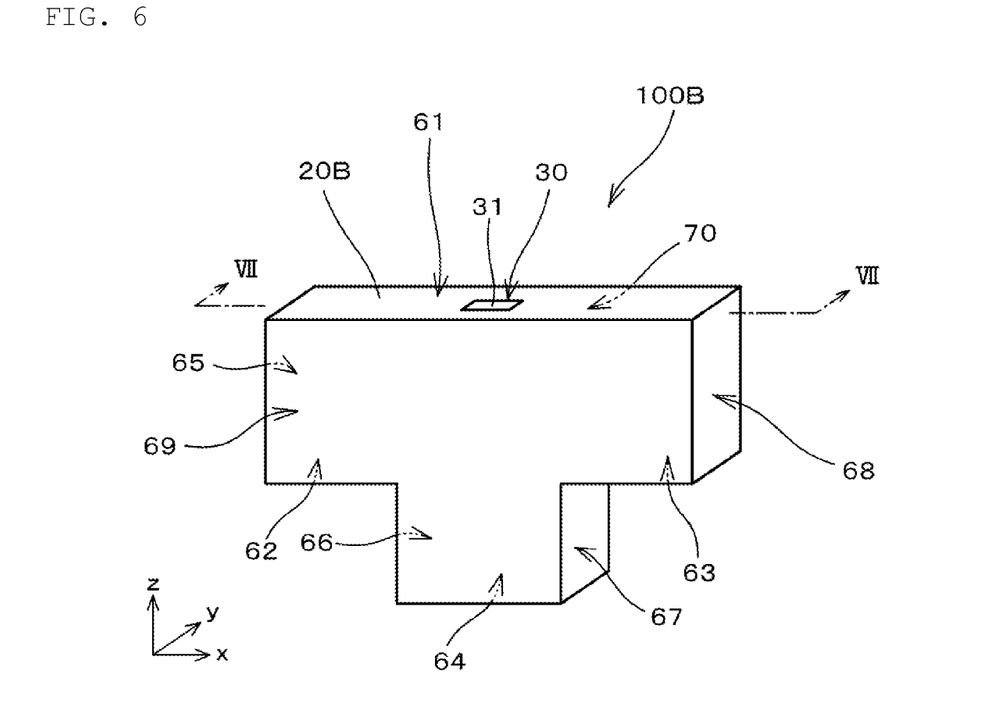
FIG. 6 is a perspective view illustrating the appearance shape of a lithium ion battery according to a third embodiment of the present invention.
Figure 7:
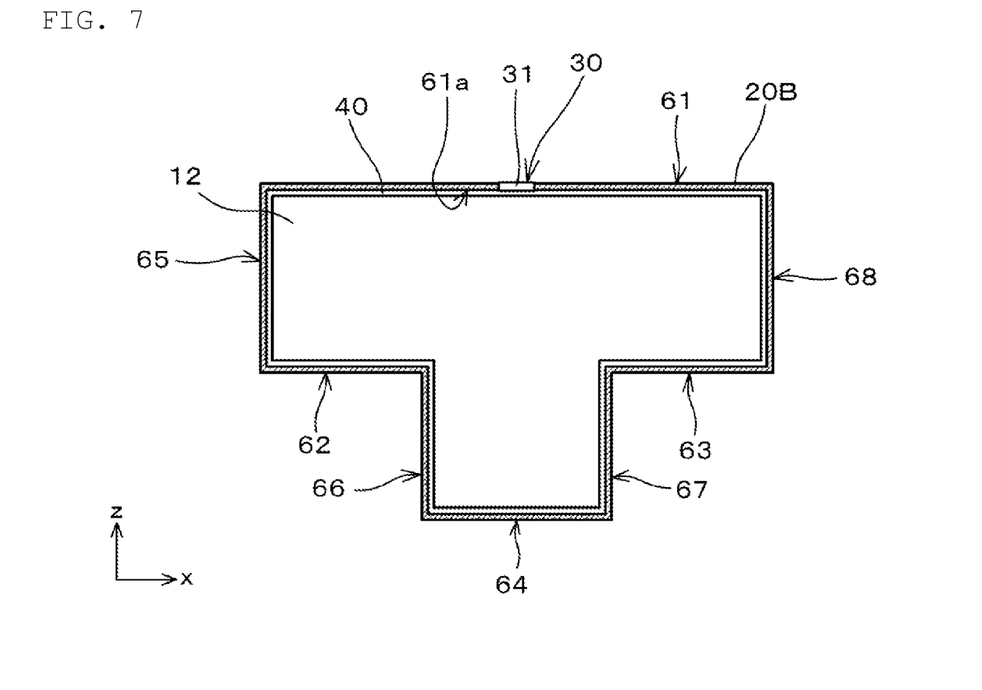
FIG. 7 is a cross-sectional view of the lithium ion battery shown in FIG. 6 along the line VII-VII.

FIG. 6 is a perspective view illustrating the appearance shape of a lithium ion battery 100B according to the third embodiment. FIG. 7 is a cross-sectional view of the lithium ion battery 100B shown in FIG. 6 along the line VII-VII. In FIGS. 6 and 7, the same constituents as those shown in FIGS. 1 to 3 are denoted by the same symbols, and detailed descriptions thereof will be omitted.

The lithium ion battery 100B includes an electrode body 10, an exterior can 20B which houses the electrode body 10 and a nonaqueous electrolytic solution (not shown) which at least partially (preferably totally) permeates the electrode body 10.

Each of the positive electrodes 11, the separators 17, and the negative electrodes 14 of the electrode body 10 has a T-shape. The direction of stacking the positive electrodes 11, the separators 17, and the negative electrodes 14 is the y-axis direction.

The exterior can 20B has an irregular shape other than a substantially rectangular parallelepiped or a cubic shape. According to this embodiment, the exterior can 20B has a first through fourth outer surfaces 61-64 that are planar surfaces which lie parallel to the xy plane, fifth through eighth outer surface 65-68 that are planar and lie parallel to the yz plane and ninth and tenth outer surfaces 69 and 70 that are planar and lie parallel to the xz plane.

The second, third and fourth outer surfaces 62-64 oppose the first outer surface 61. The fifth outer surface 65 opposes the eighth outer surface 68. The sixth outer surface 66 opposes the seventh outer surface 67. The ninth outer surface 69 opposes the tenth outer surface 70. The first to eighth outer surfaces 61 to 68 each have an oblong (rectangular) shape and the ninth and tenth outer surfaces 69 and 70 have a T-shape.

The first to eighth outer surfaces 61 to 68 are planar surfaces which lie perpendicular to the stacking direction (the Y direction) of the positive electrodes 11, the separators 17, and the negative electrodes 14. Of those outer surfaces, the first outer surface has the largest area. The thickness of the walls of the exterior can 20B is substantially the same at all of the surfaces. Each of the first through sixth surfaces 61-66 has a corresponding inner surface facing it. The largest of the inner surfaces is inside surface 61a corresponding to (facing) the first outer surface 61.

The liquid injection port 30 is preferably provided at the inner surface 61a and more preferably at the center of inner surface 61a.

Like the foregoing embodiments, a holding region 40 is located between the largest inner surface 61a and the adjacent outer periphery of the electrode body 10. The holding region 40 is capable of temporarily holding the nonaqueous electrolytic solution injected into the exterior can 20 B via the liquid injection port 30 until it migrates into the electrode body 10. As in the first and second embodiments, the distance between the largest inner surface 61a and the adjacent outer periphery of the electrode body 10 in the holding region 40 is, for example, between 50 μm and 500 μm. The holding region 40 has a larger volume than any of the other regions between the other inner surfaces of the exterior can 20B and the adjacent outer edge of the electrode body 10 as measured in a direction parallel to the stacking direction.

As in the first and second embodiments, the regions adjacent to the holding region 40 preferably have a size which is capable of keeping the nonaqueous electrolytic solution injected into the exterior can 20B via the liquid injection port 30 into the holding region 40 from flowing out from the holding region 40 in any significant manner. In this embodiment, the regions located adjacent to the holding region 40 are the regions between the inside surface corresponding to the fifth and eighth outer surfaces 65 through 68 and their respective adjacent outer periphery of the electrode body 10. The distances between the inner surfaces of the exterior can 20B and the electrode body 10 that constitute the foregoing regions are, for example, less than 20 μm.

The nonaqueous electrolytic solution injected from the liquid injection port 30 is temporarily held in the holding region 40 between the largest inner surface 61*a* of the exterior can 20B and the electrode body 10, and then slowly penetrates the inside of the electrode body 10 from the upper (part thereof.

As described above, the holding region 40 is larger in volume than the regions on opposite sides thereof, thus making it possible to maximize the amount of the nonaqueous electrolytic solution injected at any given application. As a result, the number of injections required for the nonaqueous electrolytic solution to permeate the entire inside of the electrode body 10 can be reduced and the time that is takes for the nonaqueous electrolytic solution to entirely permeate the inside of the electrode body 10 can be shortened. As a result, the manufacturing time for the lithium ion battery 100 can be reduced.

More specifically, even when the exterior can 20B has a shape as shown in FIG. 6, when the liquid injection port 30 is provided at the largest inner surface 61*a* among the multiple inner surfaces in a direction parallel to the stacking direction (the Y direction) it possible to shorten the time it takes for the nonaqueous electrolytic solution to penetrates the entire inside of the electrode body 10, as compared with a configuration in which the liquid injection port 30 is provided at a different surface.

In the above-described embodiments, the exterior body for housing the electrode body and the nonaqueous electrolytic solution is described as an exterior can 20, but the exterior body is not limited to the exterior can, and, for example, may be a laminate film.

In addition, the shape of the exterior body is not limited to the shapes described in the respective embodiments described above. In fact, the exterior body may have any irregular shape other than a substantially rectangular parallelepiped or cuboid shape.

The electrode body is not limited to the laminated electrode body described above, and may be, for example, a wound electrode body where a positive electrode and a negative electrode with a separator interposed there between are wound. Even when the wound electrode body is adopted as the electrode body, a liquid injection port for injecting the electrolytic solution has only to be provided at the largest inner surface among multiple inner surfaces in a direction parallel to the stacking direction of the positive electrodes, the separators and the negative electrodes. Thus, since the nonaqueous electrolytic solution accumulated/stored in the holding region between the largest inner surface of the exterior body and the electrode body penetrates the inside of the wound electrode body from the largest inner surface thereof, the amount of the electrolytic solution that penetrates the inside per unit time can be increased to shorten the time it takes for the electrolytic solution to completely permeate the inside of the electrode body.

In the above embodiments, a plurality of positive and negative electrodes and a plurality of separators are provided. However, a single set of one positive electrode, negative electrode and separator may be used.

In the embodiments described above, the lithium ion batteries have been described by way of example, but any battery other than the lithium ion batteries may be adopted.

The present invention is not to be considered limited to the embodiment described above in still other respects, but various applications and modifications can be made within the scope of the invention.

For the battery according to the present invention, the exterior body that houses the electrode body and the electrolytic solution has an irregular shape other than substantially rectangular parallelepiped and cuboid shape. The exterior body has multiple inner surfaces extending in a direction parallel to the stacking direction of the positive electrodes, the separators, and the negative electrodes of the electrode body. A liquid injection port for injecting an electrolytic solution is provided at the largest inner surface among the multiple surfaces, and between the largest inner surface of the exterior body and the exterior body, a holding region is provided which is capable of temporarily holding the electrolytic solution injected from the liquid injection port at the time of injecting the liquid. In addition, among respective regions between the respective inner surfaces of the exterior body and the electrode body, the regions adjacent to the holding region are each a region of a size capable of keeping the electrolytic solution injected from the liquid injection port into the holding region from flowing (in any significant amount) out from the holding region. According to this configuration, the electrolytic solution injected from the liquid injection port is temporarily held in the holding region between the largest inner surface of the exterior body and the exterior body, and then slowly penetrates the inside of the electrode body. Thus, when the exterior body has an irregular shape other than a substantially rectangular parallelepiped or cuboidal shape, the amount of the electrolytic solution injected at a time (per application) can be maximized as compared with a configuration, as compared with a configuration in which the liquid injection port is provided at another position. Therefore, the number of injections until the electrolytic solution permeates the entire inside of the electrode body can be reduced, and the time until the electrolytic solution permeates the entire inside of the electrode body can be shortened.

The distances between the inner surfaces of the exterior body and the electrode body that constitute the regions on opposite sides of the holding region are preferably adjusted to less than 20 µm, thereby making it possible to temporarily hold most of the electrolytic solution injected from the liquid injection port in the holding region.

In addition, the distance between the largest inner surface of the exterior body and the electrode body that constitute the holding region is adjusted to 50 µm or more and 500 µm or less, thereby making is possible to ensure an adequate region as a region for temporarily holding the electrolytic solution, while ensuring that the battery has a sufficient volume energy density.

In addition, the relation of the following formula (1) where V1 represents the volume of the holding region capable of temporarily holding the electrolytic solution, V2 represents the volume of the electrode body, and X (%) represents the porosity of the electrode body is established, thereby making it possible to ensure an adequate region as a region for temporarily holding the electrolytic solution, while ensuring that the battery has a sufficient volume energy density.

$$20 \leq V1/(V2 \times X/100) \leq 80 \qquad (1)$$

Further, even when the electrode body is a laminated electrode body where a plurality of positive electrodes and a plurality of negative electrodes are alternately stacked with separators interposed there between, the time it takes for the electrolytic solution to completely permeate the inside of the laminated electrode body can be shortened.

In addition, the method for manufacturing a battery according to the present invention is a method for manufacturing a battery where an electrode body and an electrolytic solution are housed inside an exterior body that has a shape other than a rectangular parallelepiped and a cube, and the exterior body has a structure including multiple inner surfaces in a direction parallel to the direction in which the positive electrode, the separator, and the negative electrode are arranged, and the method includes the steps of: (a) preparing an electrode body housing where the electrode body is housed in the exterior body provided with a liquid injection port at the largest inner surface among the multiple inner surfaces, a holding region capable of temporarily holding the electrolytic solution injected from the liquid injection port is provided between the largest inner surface of the exterior body and the electrode body, and among respective regions present between the respective inner surfaces of the exterior body and the electrode body, a region that is adjacent to the holding region is a region of a size capable of keeping the electrolytic solution injected from the liquid injection port into the holding region from flowing out from the holding region; (b) injecting the electrolytic solution into the exterior body from the liquid injection port; (c) temporarily stopping the injection, and then causing the injected electrolytic solution to permeate the inside of the electrode body; and (d) repeating the steps (b) and (c) until the penetration of the electrolytic solution into the entire inside of the electrode body is completed. Thus, when the exterior body has an irregular shape other than a rectangular parallelepiped and a cube, the electrolytic solution can be temporarily held in the largest region between the largest inner surface of the exterior body and the electrode body, and the amount of electrolytic solution injected at a time can be thus increased. Therefore, the number of injections until the electrolytic solution permeates the entire inside of the electrode body can be reduced, and the time until the electrolytic solution permeates the entire inside of the electrode body can be shortened.

DESCRIPTION OF REFERENCE SYMBOLS

10: electrode body
11: positive electrode
12: positive electrode current collector
13: positive electrode active material
14: negative electrode
15: negative electrode current collector
16: negative electrode active material
17: separator
20, 20A, 20B: exterior can
21a, 41a, 61a: the largest inner surface among multiple inner surfaces of the exterior can in a direction parallel to the direction in which the positive electrode, the separator, and the negative electrode are arranged
30: liquid injection port
31: sealing plug
40: holding region
100, 100A, 100B: lithium ion battery

The invention claimed is:

1. A battery comprising:
an electrode body including a positive electrode, a negative electrode and a separator disposed between the positive electrode and the negative electrode, the positive electrode, the negative electrode and the separator being stacked one on top of the other in a stacking direction, the electrode body having an outer periphery;
an electrolytic solution; and
an exterior body that has a shape other than a substantially rectangular parallelepiped or cuboidal shape, the exterior body housing the electrode body and the electrolytic solution, the exterior body having at least adjacent first, second and third inner surfaces with the first and third inner surfaces being located on opposite sides of the second inner surface, the second inner surface being larger in area than the first and third inner surfaces; and
a liquid injection port located on the exterior body and extending through the second inner surface;
each of the first, second and third inner surfaces facing, and being spaced from, a respective first, second and third section of the outer periphery of the electrode body by a respective gap so as define first, second and third regions, respectively, each of the first, second and third regions having a respective volume, the volume the second region being larger than the volumes of the first and third regions and being capable of temporarily holding a volume of the electrolytic solution injected into the outer case via the liquid injection port.

2. The battery according to claim 1, wherein a distance between the first and third inner surfaces and the first and third sections of the outer periphery of the electrode body being is less than 20 µm.

3. The battery according to claim 2, wherein a distance between the second inner surface and the second section of the outer periphery of the electrode body between 50 µm and 500 µm.

4. The battery according to claim 1, wherein the relationship between a volume V1 of the holding region, a volume V2 of the electrode body, and a porosity X (%) of the electrode body is:

$$20 \leq V1/(V2 \times X/100) \leq 80.$$

5. The battery according to claim 4, wherein the electrode body is a laminated electrode body having a plurality of the positive electrodes and a plurality of the negative electrodes which are alternately laminated in the stacking direction with a respective separator interposed there between.

6. The battery according to claim 1, wherein the shape of the exterior body is an L shape.

7. The battery according to claim 1, wherein the shape of the laminated body is a T shape.

8. The battery according to claim 1, wherein the shape of the laminated body is a trapezoidal shape.

9. The battery according to claim 1, wherein the liquid injection port is located in the center of the second inner surface.

10. The battery according to claim 1, wherein the shape of the electrode body is the same as the shape of the shape of the exterior body.

11. A method for manufacturing a battery, comprising:
(a) providing an exterior body having an electrode body housed therein; the exterior body having a shape other than a substantially rectangular parallelepiped or cuboidal shape, and at least first, second and third inner surfaces with the first and third inner surfaces being located on opposite sides of the second inner surface and the second inner surfaces being larger in area than the first and third inner surfaces; the electrode body comprising a positive electrode, a negative electrode and a separator disposed between the positive and negative electrodes, the positive electrode, the negative electrode and the separator being stacked one on top of the other in a stacking direction; the electrode body having an outer periphery, each of the first, second and third inner surfaces facing and being spaced from a respective first, second and third section of the outer periphery of the electrode body by a respective gap so as define first, second and third regions, respectively, each of the first, second and third regions having a respective volume, the volume the second region being larger than the volumes of the first and third regions and being capable of temporarily holding a volume of the electrolytic solution injected into the second region via a liquid injection port extending through the second inner surface;
(b) injecting the electrolytic solution into the second region via the liquid injection port;
(c) stopping the injection of the electrolytic solution into the second region and allowing at least part of the injected electrolytic solution to permeate inside of the electrode body; and
(d) repeating the steps (b) and (c) until the electrolytic solution penetrates into the entire inside of the electrode body.

\* \* \* \* \*